United States Patent
Kitazawa

(10) Patent No.: US 9,243,772 B2
(45) Date of Patent: Jan. 26, 2016

(54) VEHICLE LAMP INCLUDING LIGHT EMITTING ELEMENT WITH TILTED MOUNTING FACE

(71) Applicant: KOITO MANUFACTURING CO., LTD., Tokyo (JP)

(72) Inventor: Tatsuma Kitazawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/612,940

(22) Filed: Feb. 3, 2015

(65) Prior Publication Data
US 2015/0241010 A1 Aug. 27, 2015

(30) Foreign Application Priority Data
Feb. 25, 2014 (JP) .................... 2014-034360

(51) Int. Cl.
*F21S 8/10* (2006.01)
(52) U.S. Cl.
CPC ..................... *F21S 48/13* (2013.01)
(58) Field of Classification Search
CPC ... F21S 48/13; F21S 48/1376; F21S 48/1388; F21S 48/10; F21S 48/114
USPC ......................... 313/549; 362/516
See application file for complete search history.

(56) References Cited

U.S. PATENT DOCUMENTS

| | | | | |
|---|---|---|---|---|
| 6,851,843 B2 * | 2/2005 | Muller et al. | ................. | 362/555 |
| 7,510,310 B2 * | 3/2009 | Komatsu | ..................... | 362/466 |
| 7,918,594 B2 * | 4/2011 | Watanabe et al. | ............. | 362/507 |
| 2007/0279927 A1 * | 12/2007 | Yamamichi et al. | .......... | 362/545 |
| 2011/0085347 A1 * | 4/2011 | Tsukamoto | ................... | 362/538 |

FOREIGN PATENT DOCUMENTS

JP    2011-82117 A    4/2011

* cited by examiner

*Primary Examiner* — Tracie Y Green
(74) *Attorney, Agent, or Firm* — Sughrue Mion, PLLC

(57) ABSTRACT

A vehicle lamp includes an element installation portion including a mounting face, a light emitting element which is mounted on the mounting face and which includes a rectangular shaped light emitting face extending parallel to the mounting face, and a reflector configured to reflect light of the light emitting element. The mounting face is tilted such that each lamp left-right direction end is at a different height position. The light emitting element is mounted on the mounting face such that, with respect to a reference position where two sides of the light emitting face are parallel to a lamp front-rear axis and the other two sides of the light emitting face are perpendicular to a lamp front-rear axis, the light emitting face is positioned at a position rotated about a reference axis which is orthogonal to the light emitting face when the light emitting face is in the reference position.

4 Claims, 7 Drawing Sheets

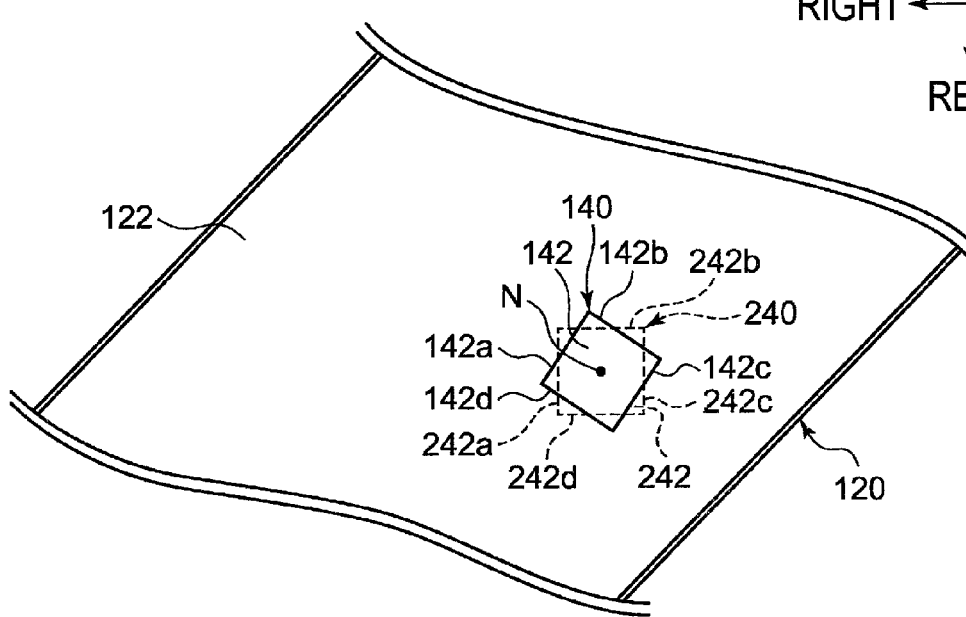
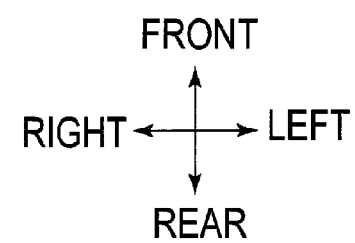
FIG. 4

VEHICLE LAMP INCLUDING LIGHT EMITTING ELEMENT WITH TILTED MOUNTING FACE

CROSS-REFERENCE TO RELATED APPLICATION

The present application claims priority from Japanese Patent Application No. 2014-034360 filed on Feb. 25, 2014, the entire content of which is incorporated herein by reference.

BACKGROUND OF INVENTION

1. Field of Invention

The present disclosure relates to a vehicle lamp. In particular, the present disclosure relates to a vehicle lamp employed in a vehicle such as a car.

2. Related Art

Vehicle lamps are known that include a light source installation portion with a light source mounting face, a light emitting element serving as the light source, and a reflector that reflects light emitted from the light emitting element in front of the lamp (see for example Patent Document 1).

PRIOR ART DOCUMENT

Patent Document

[Patent Document 1: JP-A-2011-82117

Generally, vehicle lamps such as those described above are designed such that the light source mounting face is horizontal. However, cases are conceivable in which it becomes necessary to tilt the mounting face due to the shape of the vehicle to which the vehicle lamp is installed. Careful investigation on the inventor has shown that tilting the mounting face may lead to a reduction in the formation precision of a light distribution pattern.

SUMMARY

Exemplary embodiments of the invention provide a vehicle lamp which can suppress a reduction in light distribution pattern formation precision due to tilting a light emitting element mounting face in an attached state of the vehicle lamp to a vehicle.

A vehicle lamp according to an exemplary embodiment of the invention comprises:

an element installation portion including a mounting face of a light emitting element;

at least one light emitting element which is mounted on the mounting face and which includes a rectangular shaped light emitting face extending parallel to the mounting face; and a reflector configured to reflect light of the light emitting element, wherein the mounting face is tilted such that each lamp left-right direction end of the mounting face is at a different height position, and the light emitting element is mounted on the mounting face such that, with respect to a reference position where two sides of the light emitting face are parallel to a lamp front-rear axis and the other two sides of the light emitting face are perpendicular to a lamp front-rear axis, the light emitting face is positioned at a position rotated about a reference axis which is orthogonal to the light emitting face when the light emitting element is in the reference position. According to this aspect, a reduction in light distribution pattern formation precision due to tilting the light emitting element mounting face can be suppressed.

The reflector may reflect light of the light emitting element such that one side of the light emitting face forms at least a portion of a cut-off line of a light distribution pattern. Further, the vehicle lamp may further comprise a plurality of the light emitting elements, wherein the reflector may reflect light of the plurality of the light emitting elements such that one side of the respective light emitting faces of the plurality of light emitting elements line up to form the cut-off line. Accordingly, the cut-off line of the light distribution pattern can be formed with high precision.

A vehicle lamp according to an exemplary embodiment of the invention comprises:

an element installation portion including a mounting face of a light emitting element;

at least one light emitting element which is mounted on the mounting face, and which includes a rectangular shaped light emitting face extending parallel to the mounting face; and a reflector configured to reflect light of the light emitting element; wherein the mounting face is tilted such that each lamp left-right direction end of the mounting face is at a different height position, and the light emitting element is mounted on the mounting face such that, with respect to a reference position that is a position occupied by the light emitting element when the light emitting element is oriented as determined according to a shape of a light distribution pattern to be formed with the mounting face in a horizontal state, and the mounting face is then tilted such that each lamp left-right direction end of the mounting face is at the different height position while maintaining the orientation of the light emitting element, the light emitting face is positioned at a position rotated about a reference axis which is orthogonal to the light emitting face when the light emitting element is in the reference position. According to this aspect, a reduction in light distribution pattern formation precision due to tilting the light emitting element mounting face can be suppressed.

According to the exemplary embodiments of the invention, it is possible to suppress a reduction in light distribution pattern formation precision due to tilting a light emitting element mounting face in an attached state of the vehicle lamp to the vehicle.

BRIEF DESCRIPTION OF THE DRAWINGS

FIG. 4 is an enlarged view of a light emitting element mounted to an element installation portion.

DETAILED DESCRIPTION

Figure 1:
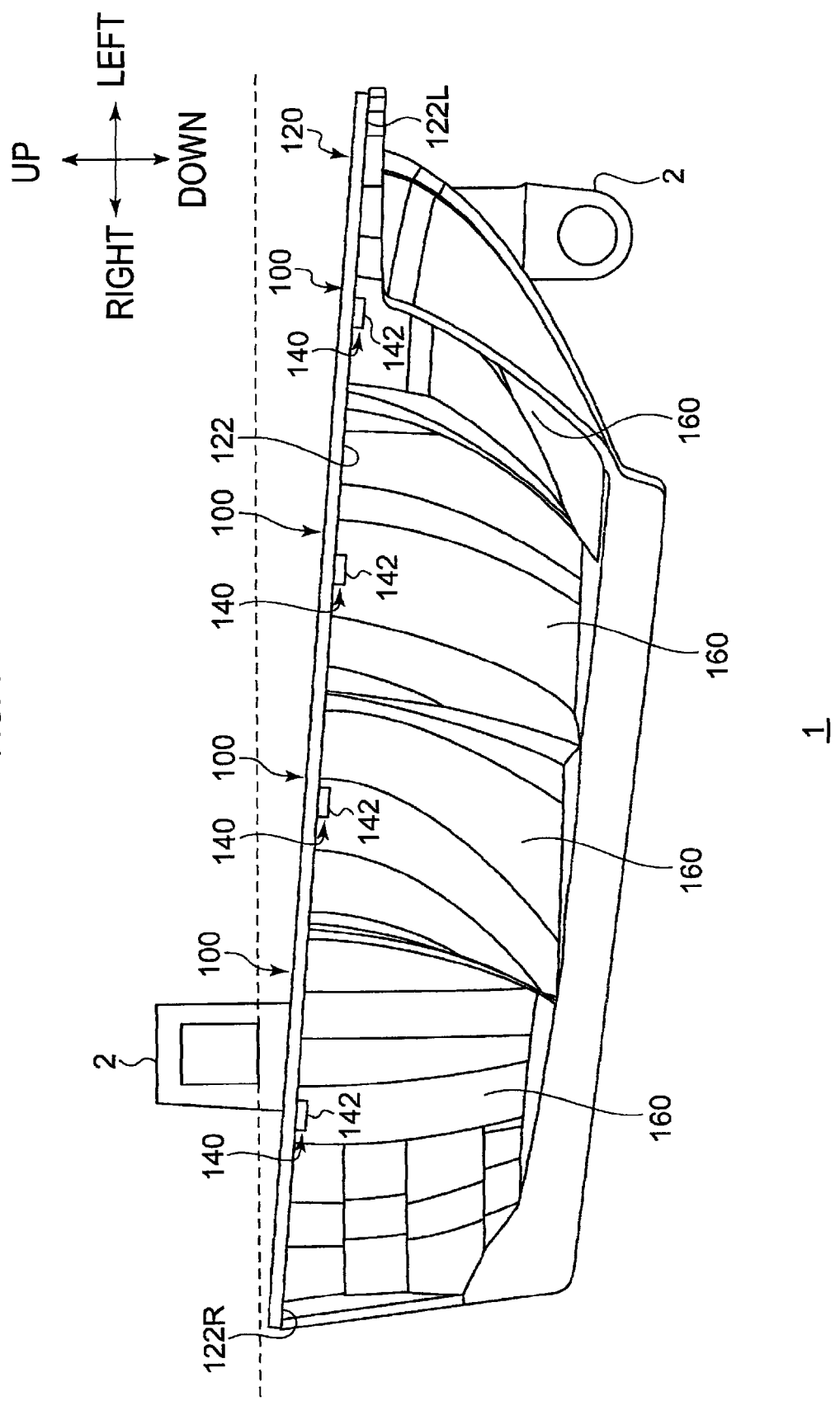
FIG. 1 is a front view showing a schematic configuration of a vehicle lamp according to an embodiment.

Explanation follows regarding a preferable embodiment of the invention, with reference to the drawings. Identical or equivalent configuration elements, members, and processing are allocated the same reference numerals in each of the drawings, and duplicate explanation thereof is omitted where appropriate. The embodiments are exemplary, and are not limitations to the invention, and not all of the features and combinations thereof in the embodiments are necessarily essential to the invention.

Figure 2:
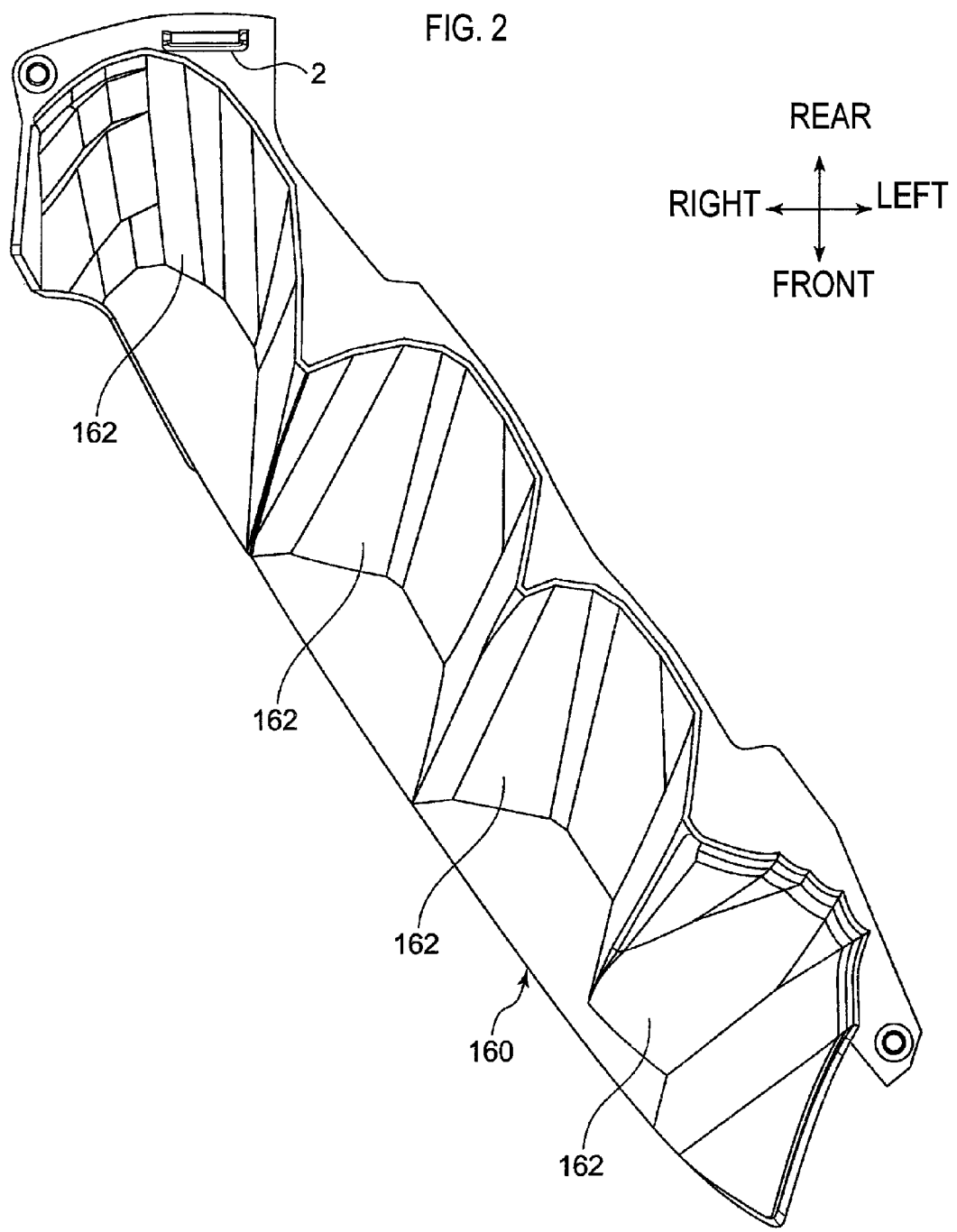
FIG. 2 is a plan view schematically showing the structure of a reflector.
Figure 3:
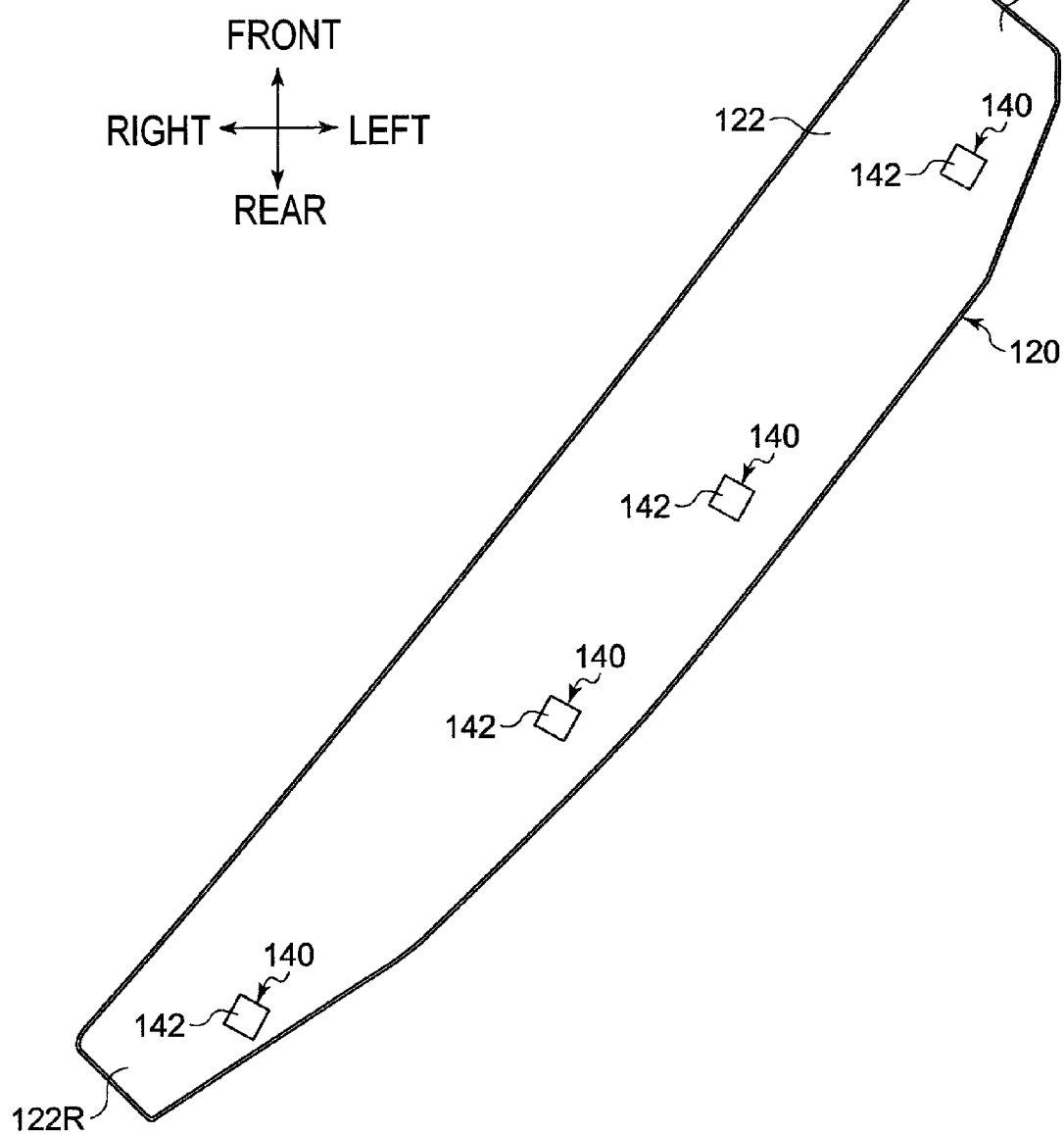
FIG. 3 is a plan view schematically showing the structure of an element installation portion.

FIG. 1 is a front view showing a schematic configuration of a vehicle lamp according to an embodiment. FIG. 2 is a plan view schematically showing the structure of a reflector. FIG. 3 is a plan view schematically showing the structure of an element installation portion. FIG. 3 is a plan view of the element installation portion viewed from a mounting face. "FRONT", "REAR", "LEFT", and "RIGHT" in FIG. 1 to FIG. 3 indicate the front, rear, left, and right of a vehicle lamp 1. The vehicle lamp 1 of the embodiment is a vehicle headlight device including a pair of headlight units disposed on the left and right at the front of a vehicle. The pair of headlight units both have substantially the same configuration, other than being structures with left and right symmetry to each other, and so FIG. 1 illustrates the structure of the vehicle right side headlight unit as the vehicle lamp 1.

The vehicle lamp 1 includes four lamp units 100. The lamp units 100 are housed inside a lamp chamber configured from a lamp body (not illustrated) with an opening at the vehicle front side, and a transparent cover (not illustrated) attached so as to cover the opening of the lamp body. The four lamp units 100 are disposed in a row along the lamp left-right direction, and adjacent units are coupled together to form an integral structure. The lamp unit 100 positioned furthest to the right (vehicle outside) functions as a fog lamp. The lamp unit 100 positioned furthest to the left (vehicle inside) functions as a cornering lamp. The two lamp units 100 therebetween function as fog lamps and cornering lamps. Note that the number, placement, and function of the lamp units 100 are not particularly limited.

The lamp units 100 are provided with support member coupling portions 2. Support members (not illustrated) projecting out from the lamp body are coupled to the support member coupling portions 2. The lamp unit 100 is attached to the lamp body thereby.

Each of the lamp units 100 is what is known as a parabolic lamp unit, and includes an element installation portion 120, a light emitting element 140, and a reflector 160.

The element installation portions 120 are substantially plate shaped members which support the light emitting elements 140. As described above, in the vehicle lamp 1 of the embodiment, the four lamp units 100 have a mutually coupled together structure. The element installation portions 120 of each of the lamp units 100 are thus coupled together such that the element installation portions 120 form a single plate shaped base.

The element installation portions 120 include a mounting face 122 on which the light emitting elements 140 are mounted. The element installation portions 120 are disposed such that the mounting face 122 faces substantially downward in the lamp, and are fixed to the reflectors 160. The mounting face 122 is tilted such that each end in the lamp left-right direction thereof is at a different height position. In other words, with respect to a horizontal plane, the mounting face 122 is tilted about an axis that is parallel to the lamp front-rear axis and passes through the mounting face 122. The broken line in FIG. 1 indicates a horizontal line. In the present embodiment, a left end 122L of the mounting face 122 is positioned lower than a right end 122R in the lamp up-down direction. A wiring pattern (not illustrated) electrically connected to the light emitting elements 140 is formed on the mounting face 122.

The light emitting elements 140 are, for example, configured by semiconductor light emitting devices such as LEDs. Each of the light emitting elements 140 has a rectangular shaped light emitting face 142. The light emitting elements 140 may have a structure combining a semiconductor light emitting device and a phosphor that converts the wavelength of light from the semiconductor light emitting device. The light emitting elements 140 are mounted on the mounting face 122 such that the light emitting faces 142 thereof face substantially downward in the lamp. The light emitting faces 142 extend parallel to the mounting face 122 in the mounted state of the light emitting elements 140 on the mounting face 122.

The reflectors 160 each include a reflective face 162 that reflects light from the light emitting element 140 to the front of the lamp. The reflectors 160 project a light pattern Pa, corresponding to the shape of the light emitting face 142 of the light emitting element 140, to the front of the lamp (see FIG. 5B). Each reflective face 162 has the basic shape of a paraboloid of revolution, with the shape partially modified to create a specific light distribution pattern. Specifically, the reflective face 162 is divided into plural areas, with a specific modification applied to each area. The positional relationships between the reflective faces 162 and the light emitting elements 140 are set such that the focal points of the reflective faces 162 coincide with the light emitting elements 140.

Next, detailed explanation follows regarding the orientation of the light emitting elements 140 on the mounting face 122. FIG. 4 is an enlarged view of a light emitting element mounted to an element installation portion. The "FRONT", "REAR", "LEFT" and "RIGHT" of FIG. 4 correspond to the front, rear, left, and right of the vehicle lamp 1. In FIG. 4, a reference position 240 of the light emitting element 140 is shown by a broken line. The reference position 240 is a position where two sides 242a, 242c of a light emitting face 242 are parallel to the lamp front-rear axis, and the other two sides 242b, 242d are perpendicular to the lamp front-rear axis (namely, parallel to the lamp left-right axis). Note that the lamp front-rear axis is an axis parallel to the vehicle front-rear axis in an installed state of the vehicle lamp 1 to the vehicle. The lamp left-right axis is an axis parallel to the vehicle left-right axis in an installed state of the vehicle lamp 1 to the vehicle.

Alternatively, the reference position 240 may be the position occupied by the light emitting element 140 when, from a state in which the mounting face 122 is parallel to the horizontal plane with the light emitting element 140 at an orientation (a position) determined according to the shape of a light distribution pattern to be formed, the mounting face 122 is then tilted to vary the height positions of the respective ends 122L, 122R of the mounting face 122 (such that each of the ends 122L, 122R of the mounting face 122 is at a different height) while maintaining the orientation of the light emitting element 140.

Each light emitting element 140 is mounted on the mounting face 122 with the light emitting face 142 positioned at a position rotated about a reference axis N with respect to the reference position 240. The reference axis N is orthogonal to the light emitting face 242 when the light emitting elements 140 is in the reference position 240. In the present embodiment, the reference axis N is an axis passing through the center of the light emitting face 142. The rotation amount of the light emitting element 140 is adjusted appropriately according to the tilt of the mounting face 122 and the shape of the light distribution pattern to be formed. For example, say the mounting face 122 is tilted by 5° with respect to the horizontal plane, and the rotation amount of the light emitting element 140 may be 15° with respect to the reference position 240.

Explanation follows regarding differences between the light distribution pattern formed by the vehicle lamp 1 provided with the above described configuration, and a light distribution pattern formed by a vehicle lamp of a Comparative Example. In the vehicle lamp of the Comparative Example, a mounting face is tilted such that each end in the lamp left-right direction thereof is at a different height and the light emitting elements are in the reference position 240.

Figure 5A:
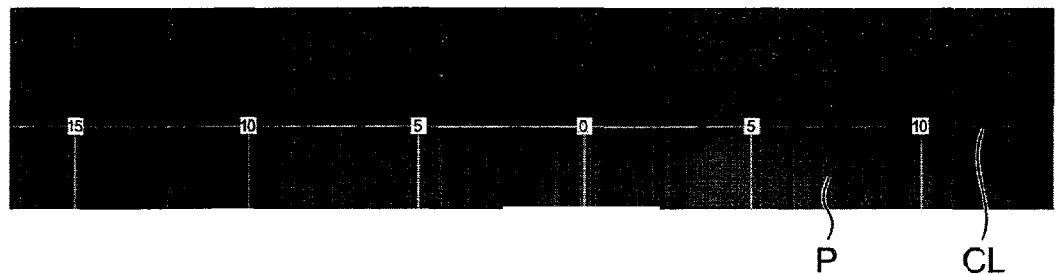
FIG. 5A is a view showing a portion of a light distribution pattern formed by the vehicle lamp of the present embodiment.
Figure 5B:
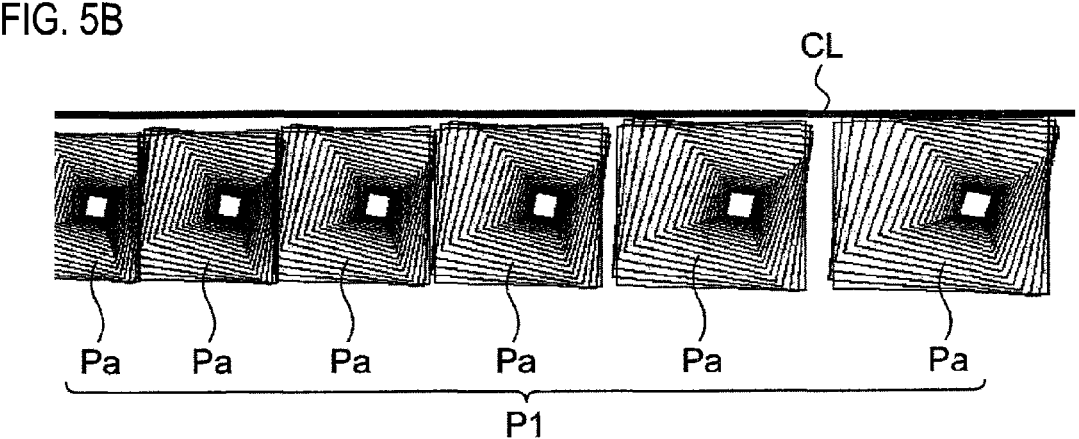
FIG. 5B is a view showing light patterns projected from the vehicle lamp of the present embodiment toward the front.
Figure 5C:
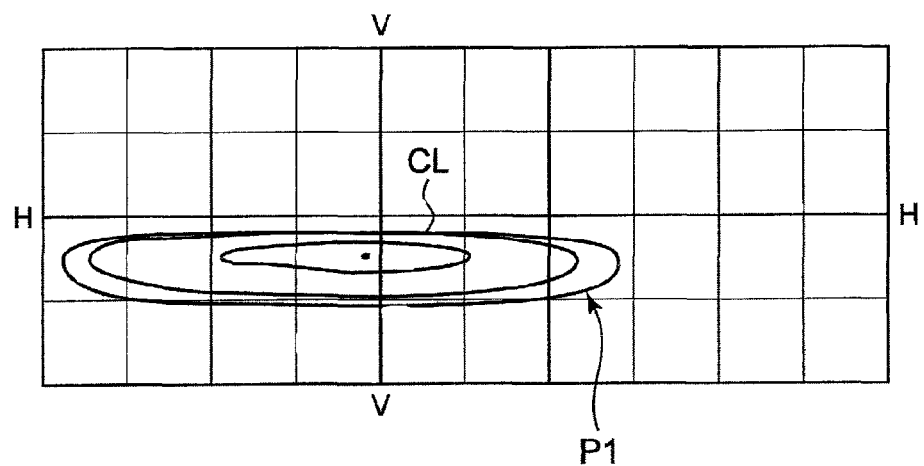
FIG. 5C is a view showing the overall light distribution pattern formed by the vehicle lamp of the present embodiment.
Figure 6A:
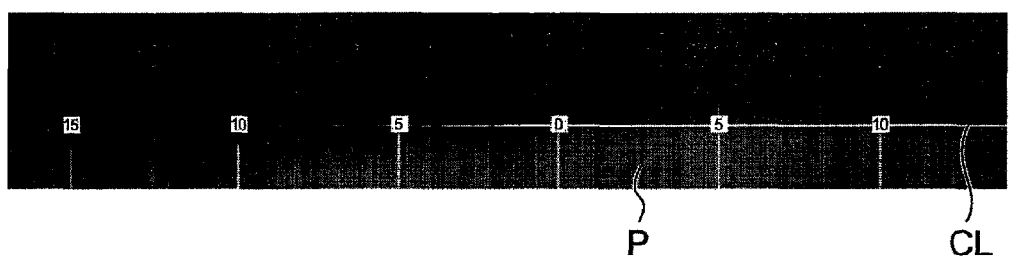
FIG. 6A is a view showing a portion of a light distribution pattern formed by the vehicle lamp of the Comparative Example.
Figure 6B:
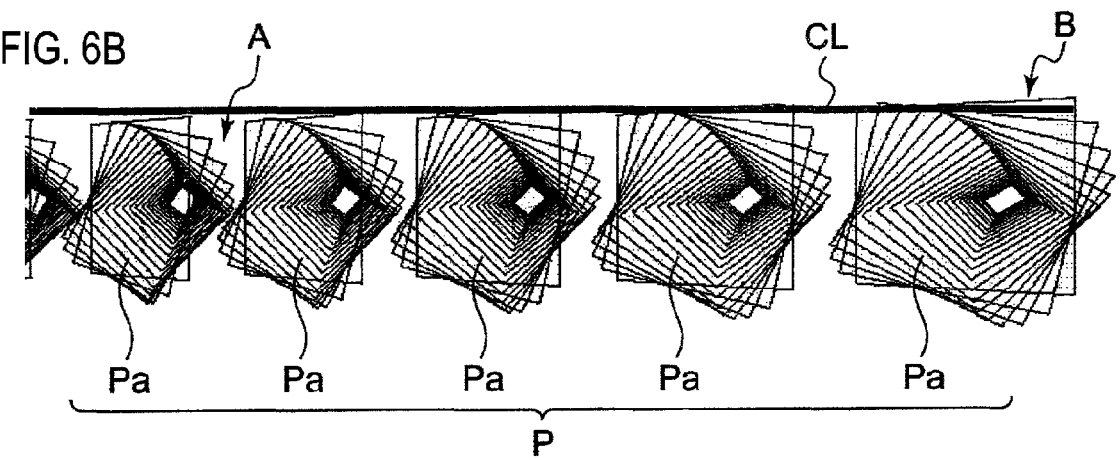
FIG. 6B is a view showing light patterns projected from the vehicle lamp of the Comparative Example toward the front.
Figure 7A:
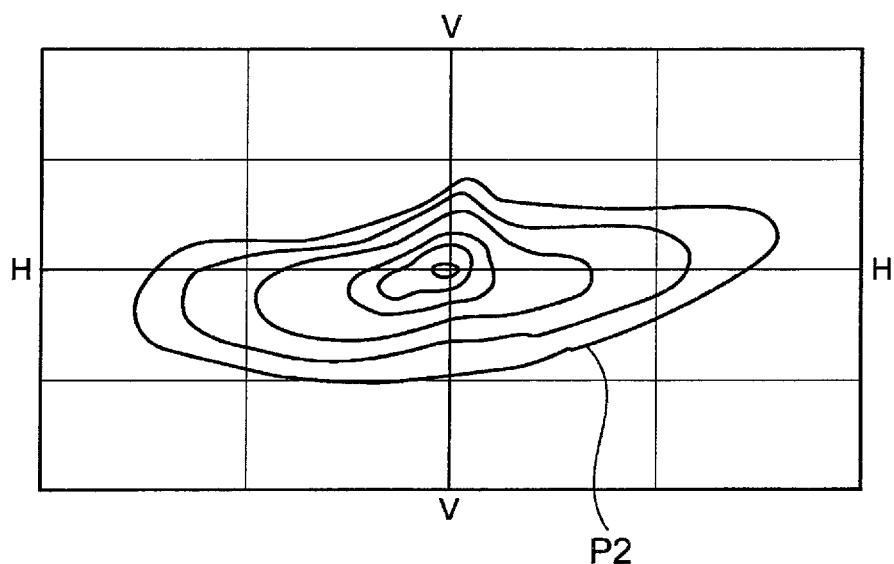
FIG. 7A is a view showing another light distribution pattern, formed by the vehicle lamp of the Comparative Example.
Figure 7B:
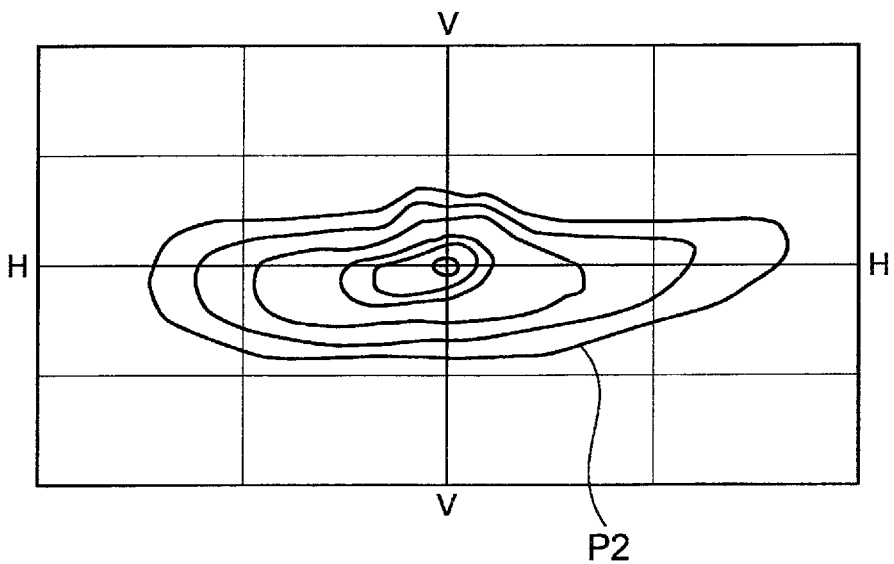
FIG. 7B is a view showing another light distribution pattern, formed by the vehicle lamp of the present embodiment.

FIG. 5A illustrates a portion of a light distribution pattern formed by the vehicle lamp of the present embodiment. FIG. 5B illustrates light patterns projected from the vehicle lamp of the present embodiment toward the front. FIG. 5C illustrates the overall light distribution pattern formed by the vehicle lamp of the present embodiment. FIG. 6A illustrates a portion of a light distribution pattern formed by the vehicle lamp of the Comparative Example. FIG. 6B illustrates light patterns projected from the vehicle lamp of the Comparative Example toward the front. FIG. 7A illustrates another light distribution pattern, formed by the vehicle lamp of the Comparative Example. FIG. 7B illustrates another light distribution pattern, formed by the vehicle lamp of the present embodiment. FIG. 5C, FIG. 7A, and FIG. 7B show the light distribution patterns formed on a hypothetical vertical screen placed at a specific position in front of the lamp, for example 25m in front of the lamp.

As illustrated in FIG. 5A to FIG. 5C, the reflectors 160 of the vehicle lamp 1 of the present embodiment reflect the light of the light emitting element 140 such that one side of the light emitting face (for example the side 142c) forms at least a portion of a cut-off line CL of the light distribution pattern P1. In the present embodiment, the vehicle lamp 1 includes plural of the light emitting elements 140, and the reflectors 160 reflect the light of the plural light emitting elements 140 such that the one sides of the respective light emitting faces 142 of the plural light emitting elements 140 line up to form the cut-off line CL. Namely, the light patterns Pa corresponding to the light emitting faces 142 of the light emitting elements 140 are lined up in a row with one side of each of the light patterns Pa contiguous to one another, thereby forming the cut-off line CL of the light distribution pattern P1.

As illustrated in FIG. 6A and FIG. 6B, in the vehicle lamp of the Comparative Example, in which the mounting face is tilted with respect to the horizontal plane and the light emitting elements are in the reference position, the one sides of the light patterns Pa projected in front of the lamp are at an angle with respect to where the cut-off line CL should be formed. Some of the light patterns Pa overshoot where the cut-off line CL should be formed due to the angle of the light pattern Pa. When a portion B overshooting the cut-off line CL is present, part of a bright region of the light distribution pattern P overshoots where the cut-off line CL should be formed. Moreover, due to the angle of the light patterns Pa, the distance between adjacent light patterns Pa increases, and comparatively large gaps A arise between adjacent light patterns Pa. The presence of such gaps A results in portions where the bright region of the light distribution pattern P does not reach where the cut-off line CL should be formed. It is accordingly difficult to form the light distribution pattern P1 with the desired cut-off line CL.

However, as illustrated in FIG. 5A to FIG. 5C, in the vehicle lamp 1 of the present embodiment, the light emitting elements are in positions rotated about the reference axis N with respect to the reference position. The light patterns Pa can accordingly be projected such that the one sides of the light patterns Pa are parallel to where the cut-off line CL should be formed. The occurrence of the gaps A, and of the portions B that overshoot the cut-off line CL, can accordingly be suppressed. The light distribution pattern P1 can accordingly be formed with the desired cut-off line CL.

As illustrated in FIG. 7A, in the vehicle lamp of the Comparative Example, when a light distribution pattern P2 is formed without the cut-off line CL, the overall light distribution pattern P2 is formed with diagonal distortion. However, as illustrated in FIG. 7B, in the vehicle lamp 1 of the present embodiment, the overall light distribution pattern P2 can be formed extending in the horizontal direction, without distortion. Any uncomfortable feeling experienced by the driver can accordingly be reduced, and a reduction in the driver's visibility can also be suppressed. The light distribution pattern P2 is, for example, a high beam light distribution pattern.

As described above, in the vehicle lamp 1 of the present embodiment, the mounting face 122 of the light emitting element 140 is tilted such that the height positions of each end 122L, 122R in the lamp left-right direction are different to each other. The light emitting elements 140 are disposed at positions rotated from the reference position 240 where the two sides 242a, 242c of the light emitting face 242 are parallel to the lamp front-rear axis, and the other two sides 242b, 242d are perpendicular to the lamp front-rear axis. Alternatively, the light emitting elements 140 may be disposed in positions rotated with respect to the reference positions 240 that are positions occupied by the light emitting elements 140 when the light emitting elements 140 are oriented as determined according to the shape of the light distribution pattern with the mounting face 122 in a horizontal state, and the mounting face 122 is then tilted while maintaining the orientation of the light emitting elements 140. A reduction in light distribution pattern formation precision due to the mounting face 122 being tilted in an attached state of the vehicle lamp to the vehicle can accordingly be suppressed.

The reflector 160 reflects the light of the light emitting element 140 such that the one side of the light emitting face 142 forms at least a portion of the cut-off line CL of the light distribution pattern P1. The reflectors 160 moreover reflect light such that the one sides of the plural light emitting faces 142 line up to form the cut-off line CL. The cut-off line CL can accordingly be formed with high precision, even when the mounting face 122 is tilted.

The invention is not limited to the embodiment described above, and the scope of the invention includes embodiments applied with various modifications, such as design modifications, that may be applied drawing on the expertise of a practitioner skilled in the art. A new embodiment resulting from combining the above embodiment with the following modification exhibits the combined advantageous effects of both the embodiment and the modification.

In the embodiment described above, all four of the light emitting elements 140 are disposed at positions twisted with respect to the reference position 240. However, there is no particular limitation thereto, and the advantageous effect of suppressing a reduction in the formation precision of the light distribution pattern caused by tilting the mounting face 122 can be exhibited as long as at least one of the light emitting elements 140 is disposed in a twisted position.

What is claimed is:

1. A vehicle lamp comprising:
   an element installation portion including a mounting face for a light emitting element;
   at least one light emitting element which is mounted on the mounting face and which includes a rectangular shaped light emitting face extending parallel to the mounting face; and
   a reflector configured to reflect light of the light emitting element, wherein
   the mounting face tilted with respect to a horizontal plane such that opposite ends of the mounting face in a direction along the horizontal plane are at different distances from the horizontal plane, and
   the at least one light emitting element is mounted on the mounting face such that, with respect to the horizontal plane where two sides of the light emitting face are parallel to a lamp front-rear axis and the other two sides of the light emitting face are perpendicular to the lamp front-rear axis, the light emitting face is positioned at a position rotated about an axis passing through the light emitting face which is orthogonal to the light emitting face.

2. The vehicle lamp of claim 1, wherein the reflector reflects light of the light emitting element such that one side of the light emitting face forms at least a portion of a cut-off line of a light distribution pattern.

3. The vehicle lamp of claim 2, further comprising:
   a plurality of the light emitting elements, wherein
   the reflector reflects light of the plurality of the light emitting elements such that one side of the respective light emitting faces of the plurality of light emitting elements line up to form the cut-off line.

4. A vehicle lamp comprising:
   an element installation portion including a mounting face for a light emitting element;
   at least one light emitting element which is mounted on the mounting face, and which includes a rectangular shaped light emitting face extending parallel to the mounting face; and
   a reflector configured to reflect light of the light emitting element; wherein
   the mounting face is tilted with respect to a horizontal plane such that opposite ends of the mounting face in a direction along the horizontal plane are at different distances from the horizontal plane, and
   the at least one light emitting element is mounted on the mounting face such that, with respect to the horizontal plane where the light emitting element is oriented as determined according to a shape of a light distribution pattern to be formed with the mounting face in a horizontal state, and the mounting face is then tilted with respect to the horizontal plane such that opposite ends of the mounting face in a direction along the horizontal plane are at different distances from the horizontal plane while maintaining the orientation of the light emitting element, the light emitting face is positioned at a position rotated about an axis passing through the light emitting face which is orthogonal to the light emitting face.

* * * * *